(12) United States Patent
Lee et al.

(10) Patent No.: US 10,296,058 B2
(45) Date of Patent: May 21, 2019

(54) EMI SHIELDING FOR DISCONNECTED CONTACTS

(71) Applicant: Apple Inc., Cupertino, CA (US)

(72) Inventors: Meng Chi Lee, Los Altos, CA (US); Ayewin Oung, Santa Clara, CA (US); Eric S. Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 15/180,087

(22) Filed: Jun. 13, 2016

(65) Prior Publication Data

US 2017/0071069 A1 Mar. 9, 2017

Related U.S. Application Data

(60) Provisional application No. 62/215,561, filed on Sep. 8, 2015.

(51) Int. Cl.
*H05K 5/02* (2006.01)
*G06F 1/18* (2006.01)

(52) U.S. Cl.
CPC .................................. *G06F 1/182* (2013.01)

(58) Field of Classification Search
CPC .................................................... H05K 5/0247
USPC .......................................................... 361/803
See application file for complete search history.

(56) References Cited

U.S. PATENT DOCUMENTS

| | | | |
|---|---|---|---|
| 2004/0145917 A1* | 7/2004 | Eisenstadt | G05F 1/465 363/15 |
| 2008/0289942 A1* | 11/2008 | Shi | H01H 1/24 200/341 |
| 2011/0151689 A1* | 6/2011 | Lin | G01R 1/0408 439/66 |
| 2014/0017942 A1* | 1/2014 | Mason | H01R 12/714 439/607.17 |
| 2016/0249466 A1* | 8/2016 | Lombardi | H05K 3/007 |
| 2017/0095300 A1* | 4/2017 | Devengenzo | A61B 34/35 |
| 2017/0162990 A1* | 6/2017 | Wu | H01R 31/06 |

* cited by examiner

*Primary Examiner* — Stanley Tso
(74) *Attorney, Agent, or Firm* — Kilpatrick Townsend & Stockton, LLP

(57) ABSTRACT

Connectors having contact structures that may generate a low amount of EMI outside of an electronic device housing the connector structure, may further provide isolation from EMI present outside of the electronic device, and reduce the chance of a user or user's property encountering a power supply on an exposed contact.

20 Claims, 5 Drawing Sheets

EMI SHIELDING FOR DISCONNECTED CONTACTS

CROSS-REFERENCES TO RELATED APPLICATIONS

This application is a nonprovisional of U.S. provisional patent application No. 62/215,561, filed Sep. 8, 2015, which is incorporated by reference.

BACKGROUND

The number of types of electronic devices that are commercially available has increased tremendously the past few years and the rate of introduction of new devices shows no signs of abating. Devices, such as tablet, laptop, netbook, desktop, and all-in-one computers, cell, smart, and media phones, storage devices, portable media players, navigation systems, monitors, and others, have become ubiquitous.

Power and data may be provided from one device to another over cables that may include one or more wire conductors, fiber optic cables, or other conductor. Connector inserts may be located at each end of these cables and may be inserted into connector receptacles in the communicating or power transferring devices. In other systems, contacts on the devices may come into direct contact with each other without the need for intervening cables.

When an electronic device is not connected to a remote device, one or more signals may be present at a connector receptacle or other connector structure on the electronic device. These signals may be high speed signals having high-frequency components. These high-frequency components can generate electromagnetic interference (EMI) that may interfere with other nearby or associated electronic devices.

Also, when an electronic device is not connected to a remote device, one or more sensitive signals or voltages may be present on one or more of the contacts. EMI from nearby or associated electronic devices may couple onto the contacts conveying these sensitive signals, thereby degrading device performance.

Further, when an electronic device is not connected to a remote device, one or more power supply voltages may be present on one or more of the contacts. These voltages may inadvertently make contact with a user or user's property.

Thus, what is needed are connectors having contact structures that may generate a low amount of EMI outside of an electronic device housing the connector structure, may further provide isolation from EMI present outside of the electronic device, and reduce the chance of a user or user's property encountering a power supply voltage on an exposed contact.

SUMMARY

Accordingly, embodiments of the present invention may provide connectors having contact structures that may generate a low amount of EMI outside of an electronic device housing the connector structure, may further provide isolation from EMI present outside of the electronic device, and reduce the chance of a user or user's property encountering a power supply voltage on an exposed contact.

An illustrative embodiment of the present invention may provide contact structure that is an apparatus for a surface contact. The surface contact may be located at a surface of a housing or enclosure for an electronic device such that a surface of the surface contact is substantially flush with the surrounding device housing, where the surface of the surface contact may be substantially flat or may be curved or have other type of surface. The surface contact may be insulated from the enclosure by a nonconducting material between the surface contact and the enclosure, or the enclosure may be nonconducting. This arrangement may limit or prevent the ingress of liquids or debris into the electronic device. The surface contact may be connected to a first terminal of a multiplexer. The multiplexer may be arranged to couple the first terminal of the multiplexer to a second terminal of the multiplexer, the second terminal connected to an input or output circuit, or both. The input and output circuits may convey signals, power supply voltages, or other signals of voltages. The multiplexer may be further arranged to couple the first terminal of the multiplexer to a third terminal of the multiplexer, the third terminal connected to ground.

When the connector that includes this surface contact apparatus is connected to a corresponding connector on a second device, the multiplexer may be arranged to couple the first terminal of the multiplexer to the second terminal of the multiplexer. The second terminal may be connected to an input or output circuit, or both. A signal or voltage provided by the electronic device that includes the surface contact may pass through the multiplexer and surface-mount contact and be received by the connected device. A signal received by the electronic device that includes the surface contact may pass through the surface-mount contact and multiplexer and be received by the electronic device. When the connector that includes this surface contact apparatus is not connected to a corresponding connector on a second device, the multiplexer may be arranged to couple the first terminal of the multiplexer to the third terminal of the multiplexer. The third terminal may be connected to ground. This may ground the surface contact. By grounding the contact, EMI that may otherwise be generated at an outside of the electronic device may be reduced. Also, sensitive signals or voltages may be protected from EMI present at the outside of the electronic device. Further, power supply voltages may be prevented from being provided to exposed contacts, where they may encounter a user or a user's property.

In various embodiments of the present invention, the multiplexer may be formed in various ways. For example, it may be formed as two series switches, with a first switch connected between the first and second terminal and a second switch connected between the first and third terminals. These switches may be transistors, micro-electronic machines, relays, or other types of switches.

In various embodiments of the present invention, the electronic device housing the surface contact apparatus may detect the presence of a connection to a second device in various ways. Accordingly, these switches may be under control of a microcontroller, central processing unit (CPU), or other appropriate logic circuit. For example, a CPU may receive information that a connection to a second device has been made. In response, the CPU may instruct the multiplexer to connect its first terminal to its second terminal. In other embodiments of the present invention, a proximity detector, such as a Hall-effect device, may be used to control the multiplexer. Specifically, when a Hall-effect device detects a presence of accessory 120, the Hall-effect device may instruct the multiplexer to connect its first terminal to its second terminal. When the connected device is removed, the CPU or Hall-effect device may instruct the multiplexer to connect its first terminal to its third terminal, thereby grounding the surface contact and preventing or reducing EMI.

Instead of using an electronic multiplexer, embodiments of the present invention may employ a physical multiplexer. An illustrative embodiment of the present invention may provide an electronic device in an enclosure. Surface contacts may be located at a surface of the enclosure. The electronic device may further include a main logic board having a second contact. This second contact may be electrically connected to traces and circuits on the main logic board. These circuits may receive signals or other voltages, or provide signals or other voltages, or both. The surface contacts may be held in place at the surface of the device by springs or other compressible structures. This arrangement may limit or prevent the ingress of liquids or debris into the electronic device. When the electronic device is not connected, the surface contacts may be electrically connected to an enclosure of the electronic device. The enclosure may be grounded, and accordingly contacts may also be grounded. This may prevent or reduce EMI leakage out of the electronic device. This may further prevent or limit EMI outside of the device from coupling onto circuitry in the device. Also, it may prevent power supply voltages from being present on exposed contacts on a surface of the device.

When a second device is mated with the electronic devices, the surface contacts may be pushed into the electronic device. This may compress springs or other compressible structures. In this way, each surface contact may be electrically connected to a corresponding second contact on the main logic board. Signals and voltages may then be conveyed between the surface contacts and the second contacts.

In this arrangement, the surface contacts may either be grounded or connected to convey signals or other voltages, such as power supply voltages. As such, the arrangement of surface contacts, springs or compressible structures, and second contacts, may form a physical multiplexer analogous to the electronic multiplexer.

In various embodiments of the present invention, components of the contact structures or apparatus may be formed in various ways of various materials. For example, conductive portions may be formed by stamping, metal-injection molding, machining, micro-machining, 3-D printing, or other manufacturing process. The conductive portions, such as contacts, enclosures, and other portions, may be formed of stainless steel, steel, copper, copper titanium, phosphor bronze, palladium, palladium silver, ceramics, or other material or combination of materials. They may be plated or coated with nickel, gold, or other material. The nonconductive portions, such as the housings, enclosures, and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials.

Embodiments of the present invention may provide contact structures or apparatus that may be located in various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These devices may include contact structures or apparatus that may provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the contact structures or apparatus may be used to convey a data signal, a power supply, and ground.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
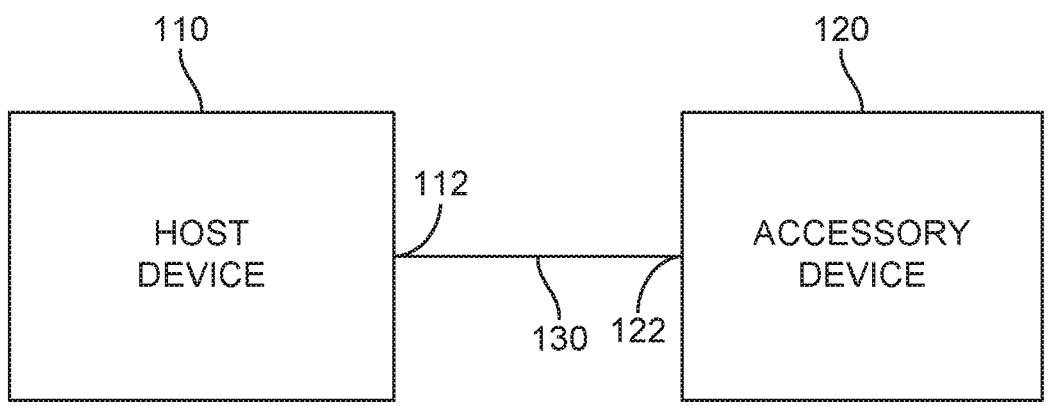
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

In this example, the host device 110 may be connected to accessory device 120 in order to share data, power, or both. Specifically, contacts 112 on host device 110 may be electrically connected to contacts 122 on accessory device 120. Contacts 112 on host device 110 may be electrically connected to contacts 122 on accessory device 120 via cable 130. In other embodiments of the present invention, contacts 112 on host device 110 may be directly and electrically connected to contacts 122 on accessory device 120 without the need for an intervening cable.

To facilitate a direction connection between contacts 112 on host device 110 and contacts 122 on accessory device 120, contacts 112 may be surface contacts. These contacts may be contacts that are exposed at a surface of device 110 when accessory device 120 is not connected. But since contacts 112 are at a surface of host device 110, if a signal is provided at one of the contacts 112, it may generate EMI external to the host device 110. Also, EMI present at an outside of host device 110 may couple onto a sensitive voltage or signal on a contact 112. Further, when a power supply is provided on a contact 112, a user, or a user's property, may inadvertently come into direct contact with the power supply at the exposed surface contact.

Accordingly, embodiments of the present invention may provide circuit, methods, and structures where contacts are grounded when a host or first device is not connected to an accessory or second device. An example of one such surface contact 112 apparatus is shown in the following figure.

Figure 2:
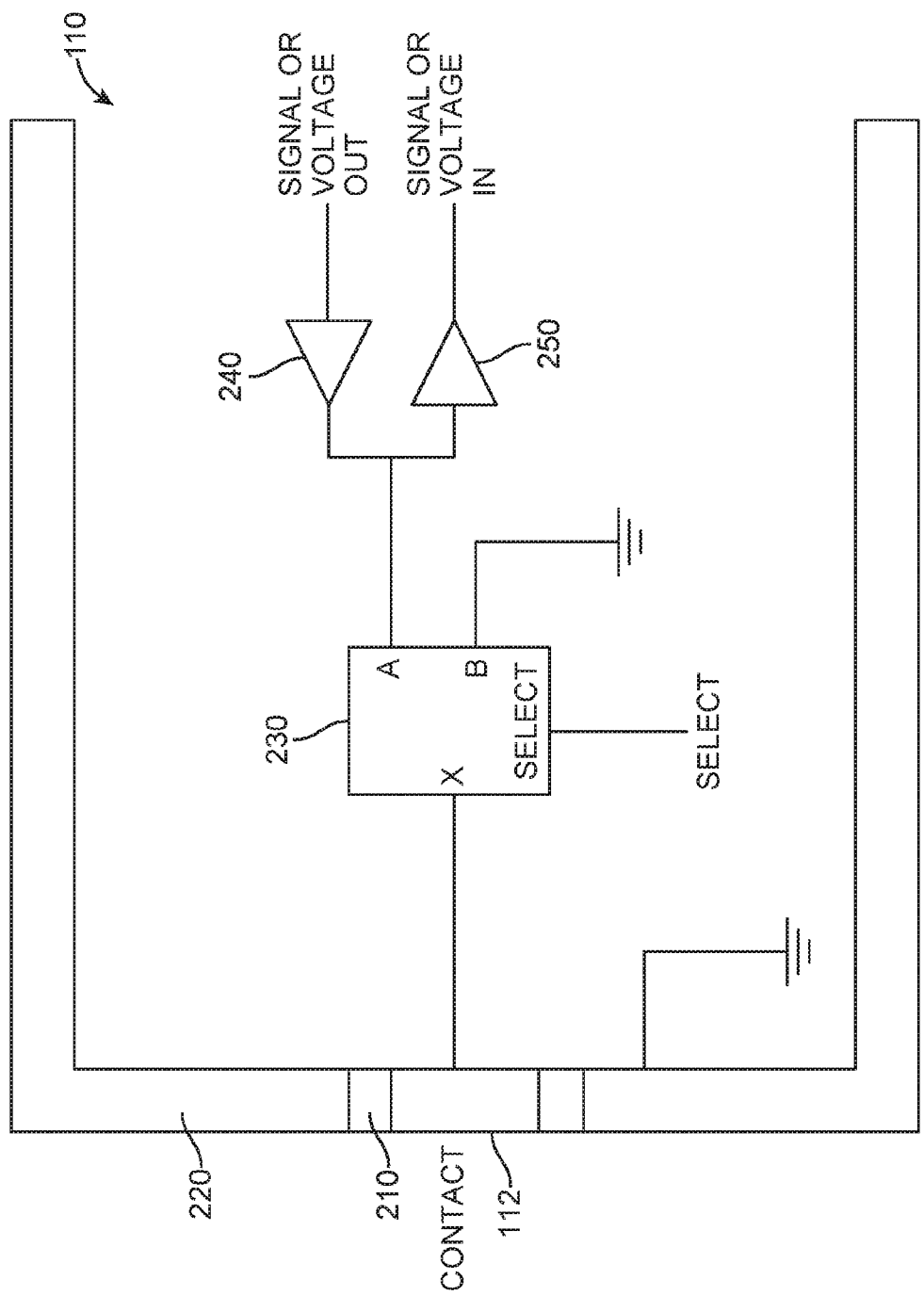
FIG. 2 illustrates an apparatus for a surface contact according to an embodiment of the present invention.

FIG. 2 illustrates an apparatus for a surface contact according to an embodiment of the present invention. In this example, an electronic device, such as host 110, may include housing or enclosure 220. Contacts 112 may be located at a surface of the device housing or enclosure 220. The device enclosure 220 may be grounded as shown. Contact 112 may be electrically isolated from the grounded device enclosure 220 by insulation area 210. For example, insulation area 210 may be formed as a ring around contact 112 preventing contact 112 from directly or electrically connecting to device enclosure 220. In these and other embodiments of the present invention, some of all of device enclosure 220 may be either conductive or nonconductive. Where a nonconductive enclosure 220 is used, insulation area 210 may be obviated.

Multiplexer 230 may have a terminal X connected to contact 112. The terminal X may be connected to contact 112 and may be selectively connected to terminal A or terminal B of multiplexer 230. This selection may be made under control of a selection signal SELECT received by multiplexer 230. When terminal A is connected to terminal X of multiplexer 230, signals received at contact 112 may be provided by multiplexer 230 to the input buffer 250, and output signals from output buffer 240 may be provided to contact 112. When terminal B of multiplexer 230 is selected, contact 112 may be grounded through multiplexer 230. While in this example terminal A of multiplexer 230 is shown as being connected to input buffer 250 and output buffer 240, terminal A of multiplexer 230 may be connected to other circuits, such as only input buffer 250, output buffer 240, a power supply voltage source, or other bias, signal, or voltage input or output.

When no device is connected, multiplexer 230 may select terminal B such that contact 112 is grounded. In this configuration, contact 112 and device enclosure 220 are grounded. This may limit the EMI seen external to host device 110. It may protect signals or voltages connected inside the electronic device to contact 112 from EMI coupling. Also, it may prevent power supply voltages from being present on exposed contact 112. When an external device, such as accessory 120, is connected to host device 110, multiplexer 230 may select terminal A and connect the input and output signals, or other voltages or power supplies, to contact 112.

In various embodiments of the present invention, multiplexer 230 may be formed in various ways. For example, it may be formed as two series switches, with a first switch connected between terminals X and A, and a second switch connected between terminals X and B. These switches may be transistors, micro-electronic machines, relays, or other types of switches. These switches may be under control of a microcontroller, CPU, or other appropriate logic circuit. For example, a CPU may receive information that a connection to an accessory has been made. In response, the CPU may instruct multiplexer 230 to connect its terminal A to its terminal X by asserting the signal SELECT to the select input of multiplexer 230. In other embodiments of the present invention, a proximity detector, such as a Hall-effect device, may be used to control the select input of multiplexer 230. Specifically, when a Hall-effect device detects a presence of accessory 120, the Hall-effect device may use the select signal to instruct multiplexer 230 to connect its terminal A to its terminal X to connect the input and output signals to contact 112. When accessory 120 is removed, the Hall-effect device may instruct multiplexer 230 to connect its terminal B to its terminal X, thereby grounding contacts 112 and preventing or reducing EMI. In other embodiments of the present invention, other types of contacts, such as those shown below, may physically change positions when an accessory 120 is mated with host device 110. This physical change in position may be used to generate the SELECT signal to control multiplexer 230.

In these and other embodiments of the present invention, a physical multiplexer may be used in place of electronic multiplexer 230. An example is shown in the following figures.

Figure 3:
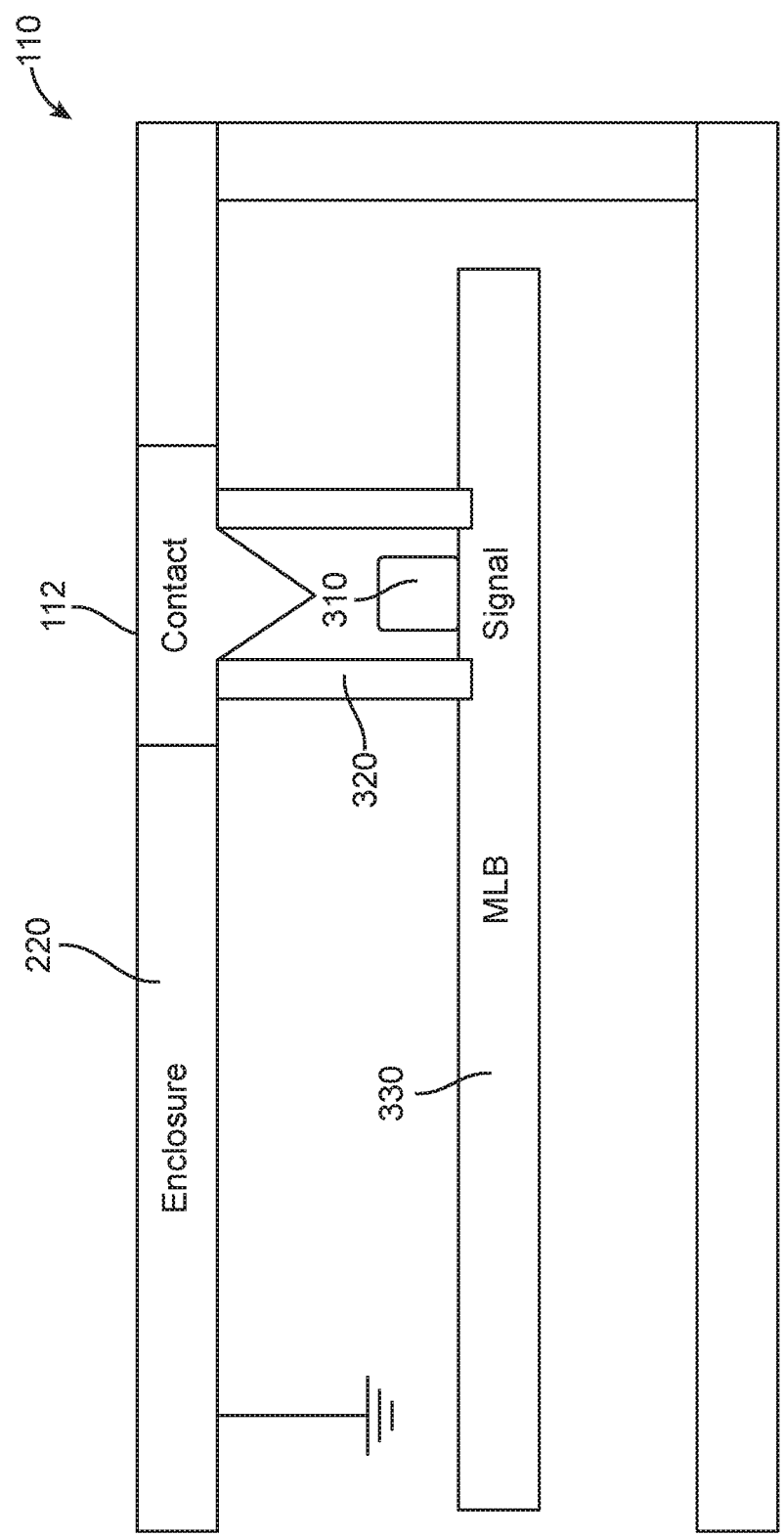
FIG. 3 illustrates an electronic device having a contact multiplexing apparatus according to embodiment of the present invention.

FIG. 3 illustrates an electronic device having a contact multiplexing apparatus according to embodiment of the present invention. A device, in this example host device 110, may be in an enclosure 220. Contacts 112 may be located at a surface of enclosure 220. Host device 110 may further include a main logic board 300 having a contact 310. Contact 310 may be electrically connected to traces and circuits on main logic board 330, such as input and output signal circuits 240 and 250 in FIG. 2. Contacts 112 may be held in place by springs or other compressible structures 320. In this arrangement, host device 110 is not connected to an accessory 120. Contacts 112 may be electrically connected to enclosure 220. Enclosure 220 may be grounded, and accordingly contacts 112 may also be grounded. This may prevent or reduce EMI leakage out of host device 110. This may further prevent or limit EMI outside of the device from coupling onto circuitry in host device 110 connected to contact 112. Also, it may prevent power supply voltages from being present on exposed contacts 112.

When accessory 120 (not shown) is mated with host device 110, contacts 112 may be pushed in a downward direction, that is, into host device 110. This may compress springs or other compressible structures 320, thereby electrically connecting contact 112 to contact 310. Signals on contact 310 may then be provided to contact 112.

In this arrangement, contacts 112 may either be grounded or connected to convey signals or other voltages, such as power supply voltages. As such, the arrangement of contacts 112, springs or compressible structures 320, and contacts 310, may form a physical multiplexer analogous to the electronic multiplexer 230 in FIG. 2.

Figure 4:
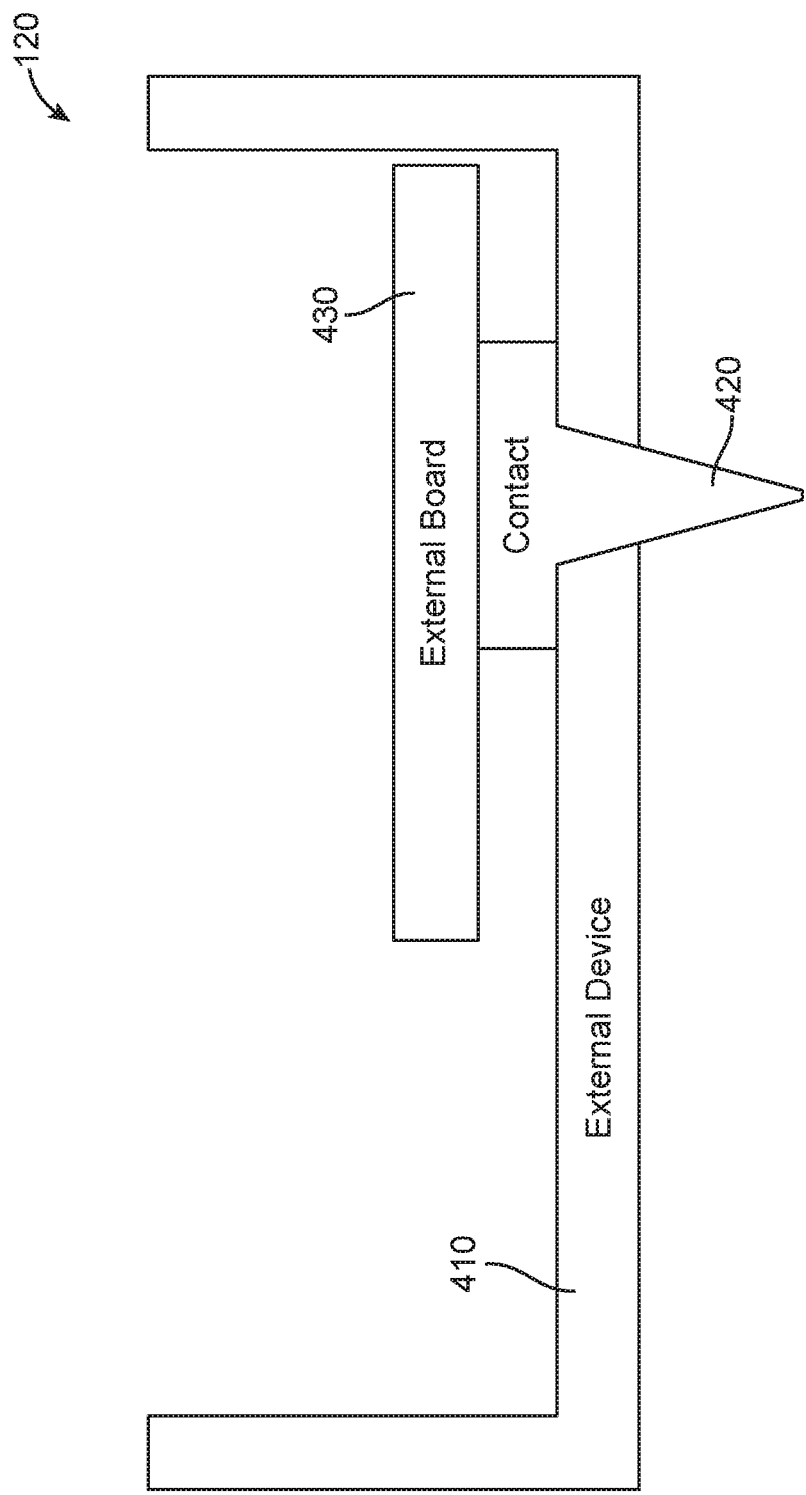
FIG. 4 illustrates an electronic device that may be mated with the electronic device of FIG. 3.

FIG. 4 illustrates an electronic device that may be mated with the electronic device of FIG. 3. In this example, a second device, such as accessory 120, may include housing 410. Contacts 420 may be extend beyond a surface of accessory 410. Contact 420 may electrically connect to one or more traces and circuits on a logic board 430.

Figure 5:
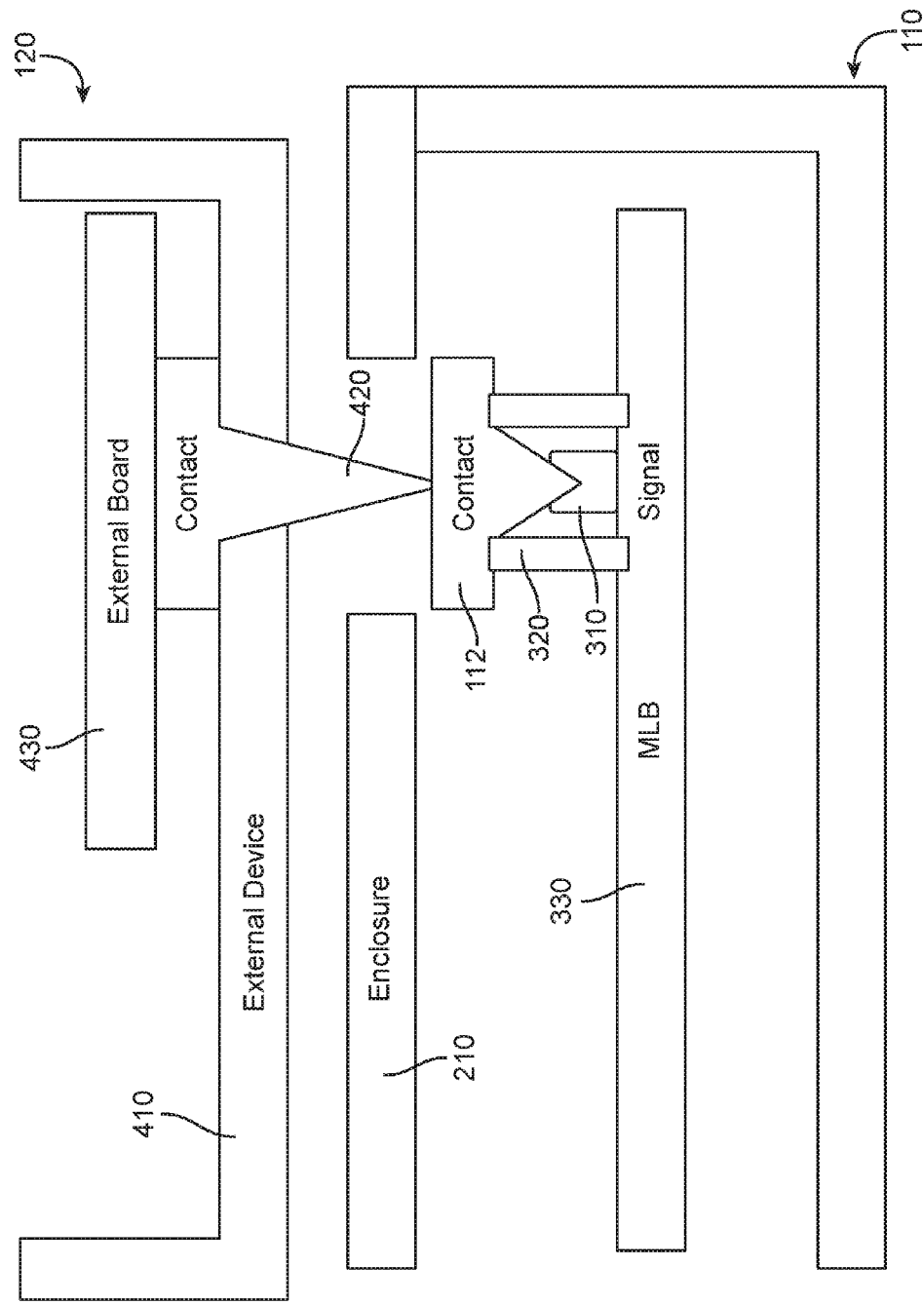
FIG. 5 illustrates an electronic system according to an embodiment of the present invention.

FIG. 5 illustrates an electronic system according to an embodiment of the present invention. In this example, a first device and a second device have been mated. In this example, host 110 has been mated with accessory 120. An enclosure 210 of accessory 110 has been brought into close proximity to housing or enclosure 410 of accessory 120. Contact 420 of accessory 120 has pushed down on contact 112 of host 110. Accordingly, contact 310 on main logic board 330 is electrically connected to contact 420 via contact 112. In this way, traces and circuits on board 430 in accessory 120 may be connected to traces and circuitry on main logic boards 330 in accessory 110 via contacts 420, 112, and 310. In this example, springs or compressible structures 320 have been compressed.

In various embodiments of the present invention, EMI shielding may be improved. For example, springs or compressible structures 320 may be grounded and isolated from contacts 112. Also, the enclosure 410 of accessory 120 may also be grounded. The grounded enclosure is may form a Faraday cage for any signals conveyed on contacts 420, one 12, and 310.

When accessory 120 is removed from host device 110, spring or compressible structures 420 may expand, thereby pushing contact 112 to a surface of enclosure 210.

In various embodiments of the present invention, it may be undesirable to allow one or more contacts 112 to be depressed while other contacts are not similarly depressed. For example, a single contact on host 110 may be inadvertently depressed by a paperclip or other object. This depression may cause power or signals to be provided at that contact, even in the absence of accessory 110. Accordingly, embodiments of the present invention may group or connect these contacts together in such a way that they may not independently be depressed, or that electrical signals are not provided at them if they are independently depressed.

In various embodiments of the present invention, the contact apparatus shown in FIG. 2 may be combined with contact apparatus shown in FIGS. 3-5. Specifically, a contact shown in FIGS. 3-5 may be used to generate a select signal that is provided to one or more contact apparatus as shown in FIG. 2. For example, when contact 112 in FIGS. 3-5 is grounded, the SELECT inputs to multiplexer 230 in FIG. 2 may be instructed to connect its terminal B to its terminal A thereby grounding contact 112 in FIG. 2. Similarly, when contact 112 in FIGS. 3-5 are not grounded, the select input to multiplexer 230 may instruct multiplexer 230 to connect its terminal A to its terminal X.

In various embodiments of the present invention, contacts 112 may have various shapes. For example, contacts 112 may have a top surface that appears circular, as a square, or has other shapes. Side edges of contacts 112 and device enclosure 210 may be beveled or angled to improve the mating between contacts 112 and enclosure 210 such that a surface of contact 112 is flush with a surface of enclosure 210.

In various embodiments of the present invention, components of the contact structures or apparatus may be formed in various ways of various materials. For example, conductive portions may be formed by stamping, metal-injection molding, machining, micro-machining, 3-D printing, or other manufacturing process. The conductive portions, such as contacts, enclosures, and other portions, may be formed of stainless steel, steel, copper, copper titanium, phosphor bronze, palladium, palladium silver, ceramics, or other material or combination of materials. They may be plated or coated with nickel, gold, or other material. The nonconductive portions, such as the housings, enclosures, and other portions, may be formed using injection or other molding, 3-D printing, machining, or other manufacturing process. The nonconductive portions may be formed of silicon or silicone, Mylar, Mylar tape, rubber, hard rubber, plastic, nylon, elastomers, liquid-crystal polymers (LCPs), ceramics, or other nonconductive material or combination of materials.

Embodiments of the present invention may provide contact structures or apparatus that may be located in various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These devices may include contact structures or apparatus that may provide pathways for signals and power compliant with various standards such as one of the Universal Serial Bus (USB) standards including USB Type-C, HDMI, DVI, Ethernet, DisplayPort, Thunderbolt, Lightning, JTAG, TAP, DART, UARTs, clock signals, power signals, and other types of standard, non-standard, and proprietary interfaces and combinations thereof that have been developed, are being developed, or will be developed in the future. In one example, the contact structures or apparatus may be used to convey a data signal, a power supply, and ground.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
an enclosure of the electronic device, where the enclosure is connected to ground;
a first opening in the enclosure;
a first contact;
a logic board;
a second contact on the logic board; and
a first compressible member between the logic board and the first contact, wherein when a sufficient force is applied to the first contact in a connection direction, the first compressible member compresses to form an electrical pathway from a surface of the first contact to the second contact, and when no force is applied, the first compressible member pushes the first contact into the first opening in the enclosure such that the surface of the first contact is flush with a surface of the enclosure, the first contact is disconnected from the second contact, and the first contact is connected to ground through the enclosure.

2. The electronic device of claim 1 further comprising:
a multiplexer having a first terminal coupled to the first contact, a second terminal coupled to a first circuit, and a third terminal coupled to ground.

3. The electronic device of claim 1 wherein the first contact comprises a surface contact.

4. The electronic device of claim 1 wherein the electrical pathway from the surface of the first contact to the second contact is configured to convey a power supply.

5. The electronic device of claim 1 wherein the electrical pathway from the surface of the first contact to the second contact is configured to convey a signal.

6. The electronic device of claim 3 wherein the multiplexer comprises a first switch coupled between the first terminal the second terminal and a second switch coupled between the first terminal the third terminal.

7. The electronic device of claim 3 wherein the first circuit comprises an input buffer and an output buffer.

8. The electronic device of claim 3 wherein the first circuit comprises circuitry to receive a power supply voltage.

9. The electronic device of claim 1 further comprising a second compressible member between the logic board and the first contact.

10. The electronic device of claim 9 wherein the first and second compressible members are springs.

11. The electronic device of claim 1 wherein the second contact electrically connects to a first circuit on the logic board.

12. The electronic device of claim 11 wherein the first circuit comprises an input buffer and an output buffer.

13. The electronic device of claim 11 wherein the first circuit comprises circuitry to receive a power supply voltage.

14. An electronic system comprising:
a host device comprising:
   a host device enclosure, wherein the host device enclosure is connected to ground;
   a plurality of openings in the host device enclosure;
   a plurality of first host device contacts;
   a host device logic board;
   a plurality of second host device contacts on the host device logic board; and
   a plurality of first compressible members, each between the host device logic board and a corresponding one of the plurality of first host device contacts, wherein for each of the plurality of first compressible members, when a sufficient force is applied to a corresponding first host device contact in a connection direction, the first compressible member compresses to form an electrical pathway from a surface of the corresponding first host device contact and a corresponding second host device contact, and when no force is applied, the first compressible member pushes the corresponding first host device contact into a corresponding opening in the host device enclosure such that the surface of the corresponding first host device contact is flush with a surface of the host device enclosure, the corresponding first host device contact is disconnected from the corresponding second host device contact, and the corresponding first host device contact is connected to ground through the host device enclosure; and
an accessory device comprising:
   an accessory device enclosure;
   a plurality of openings in the accessory device enclosure;
   an accessory device logic board; and
   a plurality of first accessory device contacts, each located in a corresponding one of the plurality of openings in the accessory device enclosure and electrically connected to the accessory device logic board.

15. The electronic system of claim 14 wherein when the accessory device is connected to the host device, the plurality of first accessory device contacts push the first plurality of host device contacts into the host device such that each of the plurality of first accessory device contacts is electrically connected to a corresponding one of the first plurality of host device contacts and one of the second plurality of host device contacts.

16. The electronic system of claim 15 wherein each of the plurality of first host device contacts comprises a surface contact.

17. The electronic system of claim 16 wherein one of the plurality of second host device contacts electrically connects to a first circuit on the host device logic board.

18. The electronic system of claim 17 wherein the first circuit comprises an input buffer and an output buffer.

19. The electronic system of claim 17 wherein the first circuit comprises circuitry to receive a power supply voltage.

20. The electronic system of claim 17 further comprising a plurality of second compressible members, each between the host device logic board and one of the plurality of first host device contacts.

* * * * *